United States Patent Office 3,003,878
Patented Oct. 10, 1961

3,003,878
PHOTOGRAPHIC EMULSIONS OF IMPROVED FLEXIBILITY AND INCREASED SILVER COVERING POWER
Bernard D. Illingsworth and Louis M. Minsk, Rochester, N.Y., assignors to Eastman Kodak Company, Rochester, N.Y., a corporation of New Jersey
No Drawing. Filed Dec. 4, 1957, Ser. No. 700,555
6 Claims. (Cl. 96—113)

This invention relates to the mixture of gelatin compositions including gelatin photographic emulsions with compounds of the hydroxyethyl cellulose type to impart improved properties thereto.

There are a number of compounds which have been recognized as useful for increasing the flexibility of photographic films. Many of these plasticizing materials are of a type which are readily leached from the gelatin layer containing it during processing operations. Also, many of these materials have no effect in decreasing the loss in density of developed silver when developed film is dried.

One object of our invention is to provide gelatin photographic emulsions containing plasticizers which will inhibit the bending desensitization thereof. Another object of our invention is to provide a plasticizer for gelatin coating compositions and particualrly gelatin photographic emulsion compositions which are resistant to removal therefrom upon processing in photographic solutions. A further object of our invention is to provide gelatin photographic emulsion compositions which exhibit an increase in covering power of the developed silver thereof, particularly high speed negative emulsions, over many types of gelatin photographic emulsions, as evidenced by an increase in speed, contrast, and $D_{max}$.

We have found that the incorporation of hydroxyethyl cellulose, modified hydroxyethyl cellulose, or certain derivatives thereof into gelatin compositions, increases the flexibility of layers prepared therefrom as may be determined by wedge brittleness and MIT fold tests or improves the covering power of the developed silver in photographic emulsions containing the same. Also, hydroxyethyl cellulose and its modifications as referred to herein are resistant to removal from photographic film during processing and, thus, contribute their effect both before and after processing.

In accordance with our invention both hydroxyethyl cellulose and modified hydroxyethyl cellulose are useful as additives to gelatin compositions, particularly photographic emulsions. Hydroxyethyl cellulose is a readily available material, its preparation having been described in several U.S. patents. In general, its methods of preparation involve the reaction of sodium cellulose with ethylene oxide or with ethylene chlorohydrin. In those products which exhibit water solubility ordinarily more than 1.5 hydroxyl groups of each $C_6$ unit of cellulose have been replaced by hydroxyethyl groups. The hydroxyethyl cellulose varies in inherent viscosities, those having inherent viscosities within the range 1.3 to 1.7 being commercially available at the present time. The inherent viscosity is 2.303 times $\log_{10}$ of the relative viscosity divided by the concentration and the relative viscosity is determined by dividing the flow time of a solution by the flow time of the solvent using a concentration of 0.250 g. of the compound diltued to 100 ml. with water.

Hydroxyethyl cellulose in accordance with our invention is added to the gelatin composition or photographic emulsion in a proportion with the range of 10–50% of the gelatin therein. Sometimes at the higher concentrations of hydroxyethyl cellulose the coatings which are obtained therefrom may exhibit a certain amount of haze or opalescence. When this is objectionable and a considerable proportion of hydroxyethyl cellulose is desired in the gelatin, a modified hydroxyethyl cellulose having greater compatibility with gelatin than the unmodified form may be preferred. For instance, if hydroxyethyl cellulose is treated with hydrogen peroxide for a sufficient time to reduce its inherent viscosity, such as to less than 1, the resulting material obtained exhibits better compatibility with aqueous gelatin than the unmodified hydroxyethyl cellulose. Another means whereby hydroxyethyl cellulose may be modified to improve its compatibility with gelatin, involves reacting thereon with a reagent imparting carboxyl groups to the hydroxyethyl cellulose such as with a dicarboxylic anhydride in the presence of pyridine or sodium acetate. Part or all of the free and esterifiable cellulose hydroxyls may be esterified thereby. The compounds thus obtained are equivalent to the unmodified hydroxyethyl cellulose in sensitometric effects in photographic emulsions but have the advantage that clear gelatin coatings are obtained even when it has been incorporated in an aqueous gelatin coating composition at high levels of addition.

Our invention is particularly directed to the incorporation of hydroxyethyl cellulose or modified hydroxyethyl cellulose in gelatin-silver halide photographic emulsion compositions such as those in which silver chloride, silver bromoiodide, or the like, are used as sensitizing agents therein. The compositions in accordance with our invention are prepared by mixing aqueous gelatin compositions with water soluble hydroxyethyl cellulose or modified hydroxyethyl cellulose in a proportion which gives a composition having the desired properties. If a photographic emulsion, the composition may be coated out onto film base to form photographic films of good flexibility, resistant to any effect by bending on the sensitivity of the photographic emulsion and to any leaching out in photographic processing.

The following examples illustrate the use of hydroxyethyl cellulose materials as addenda to photographic emulsions.

Example 1

A coarse-grained gelatin-bromoiodide emulsion was prepared for coating by adding thereto a coating aid, a hardener, and an antifoggant. The emulsion was then divided into two parts as follows: (a) no further additions, (b) 836 ccs. of a 5% solution of hydroxyethyl cellulose added per 177 gms. of gelatin. These two emulsions were coated onto a cellulose acetate film base at a coverage of 192 square feet per mole of silver and were tested for brittleness by means of standard wedge brittleness and MIT fold tests. It was found that the emulsion layer in which hydroxyethyl cellulose was introduced exhibited much better flexibilities than that to which no hydroxyethyl cellulose had been added as shown by the following data:

| Part | 70° F.—50% RH Wedge Opening in Inches, First Failure | | | 70° F.—50% RH MIT Fold, Avg. |
|---|---|---|---|---|
| | Avg. | High | Low | |
| (a) | 0.29 | 0.44 | 0.21 | 9 |
| (b) | 0.16 | 0.28 | 0.06 | 13 |

Example 2

The effect of hydroxyethyl cellulose in decreasing roller bending desensitization and increasing the covering power of the silver when used in silver halide emulsions is shown by this example.

A coarse-grained gelatino-silver-bromoiodide emulsion was prepared for coating by adding thereto a coating aid, a hardener, a suitable sensitizer, and an antifoggant. The material was divided into two parts as follows: (a) no further addition, (b) added 1175 ccs. of a 5% solution of hydroxyethyl cellulose in water per 245 gms. gelatin. These emulsions were each coated onto a cellulose acetate film base at a coverage of 202 square feet per mole of silver. Standardized roller bending tests were carried out with the following results showing the considerably less loss of speed when the emulsion layer contains hydroxyethyl cellulose.

| Part | Log E loss in Speed at Densities of— | | |
|---|---|---|---|
| | 0.40 | 0.90 | 1.20 |
| (a) | −.16 | −.17 | −.09 |
| (b) | −.02 | −.04 | −.04 |

The increase in covering power resulting from the addition of hydroxyethyl cellulose was shown by exposing one strip from each of the above-prepared films in an Eastman IB sensitometer, through a 0.13 log $E$ step wedge and developing for 5 minutes in Kodak developer DK–50. The silver density of each strip was measured and the mg. of silver per 100 square meters was determined by analysis. The following table presents the results obtained showing the increase in covering power of the emulsion to which hydroxyethyl cellulose had been added:

| Part | DK-50 | |
|---|---|---|
| | D at 15 mg., Ag/cm.$^2$ | D at 25 mg., Ag/cm.$^2$ |
| (a) | .47 | 0.87 |
| (b) | .56 | 1.0 |

*Example 3*

Samples of film were made as described in Example 1, one strip from each of the coatings was exposed in an Eastman IB sensitometer through a continuous strip wedge, developed three minutes in Kodak Rapid X-ray developer, fixed and washed. Densities were then determined on the strips both before and after drying. The following results show the decrease in wet-to-dry density loss and the increase in speed, gamma and $D_{max}$ in the emulsion containing hydroxyethyl cellulose as compared with the emulsion to which no hydroxyethyl cellulose had been added.

| Part | Wet | | | | Dry | | | | $\Delta D_{max}$ at $D=1.6$ |
|---|---|---|---|---|---|---|---|---|---|
| | Speed | $\gamma$ | Fog | $D_{max}$ | Speed | $\gamma$ | Fog | $D_{max}$ | |
| (a) | 335 | 2.40 | .04 | 2.06 | 330 | 1.84 | .06 | 1.69 | 0.44 |
| (b) | 346 | 2.46 | .04 | 2.16 | 343 | 2.32 | .06 | 1.96 | 0.14 |

*Example 4*

This example indicates the improvement in haze characteristics when a modified hydroxyethyl cellulose is used with certain photographic emulsions as compared with the product obtained when the unmodified hydroxyethyl cellulose is used. A coarse-grained gelatin-silver bromoiodide photographic emulsion was prepared for coating by adding thereto a coating aid, a hardener, and an antifoggant. The composition was then divided into 4 parts as follows: (a) no further addition, (b) added 890 ccs. of a 5% aqueous solution of hydroxyethyl cellulose (1.37 viscosity) per 179 gms. gelatin, (c) added 890 ccs. of a 5% aqueous solution of a hydroxyethyl cellulose which had been treated with hydrogen peroxide (0.74 viscosity) per 179 gms. of gelatin and, (d) added 890 ccs. of a 5% aqueous solution of a succinic acid ester of hydroxyethyl cellulose (1.37 viscosity with a titre of 2.92 ml. of normal NaOH per gram) per 179 gms. of gelatin. The various emulsions were coated on cellulose acetate film support at a coverage of 192 square feet per mole of silver. Strips of these coatings were exposed on an Eastman IB sensitometer through a continuous step wedge and were developed for 3 minutes in Kodak Rapid X-ray developer. The results obtained indicated the modified hydroxyethyl cellulose were comparable as regards speed and gamma to the unmodified hydroxyethyl cellulose but that better haze characteristics were obtained using the modified hydroxyethyl celluloses.

| Part | Speed | $\gamma$ | Fog | Dry Haze |
|---|---|---|---|---|
| (a) | 324 | 1.64 | .06 | None. |
| (b) | 332 | 1.85 | .06 | Some. |
| (c) | 330 | 2.06 | .05 | Very slight. |
| (d) | 332 | 2.05 | .05 | None. |

To subject the hydroxyethyl cellulose to a treatment to improve its gelatin compatibility properties, the viscosity thereof is reduced by treating with hydrogen peroxide at moderate temperatures for example 50° C. The residual hydrogen peroxide is then destroyed either by adding hydrazine hydrate or by raising the pH of the dope (such as with ammonia) and heating. The product is then isolated by precipitation in a non-solvent such as acetone. The introduction of carboxyl into the hydroxyethyl cellulose, whether modified or unmodified, may be by any of the procedures known in the art for accomplishing this result such as by esterifying hydroxyethyl cellulose with a dicarboxylic anhydride either in a pyridine system, in solution in acetic acid containing sodium acetate catalyst or by dissolving the hydroxyethyl cellulose in a solvent such as dimethylformamide and esterifying with the dicarboxylic acid anhydride in the presence of somewhat more than the theoretical amount of a tertiary base, such as pyridine. The use of a solvent permits the preparing of carboxylated hydroxyethyl cellulose of lower orders of reaction than can be accomplished in pyridine alone. The product can then be isolated by precipitation such as in acetone or isopropyl alcohol or by a spray drying operation. If desired, carboxyls may be introduced to hydroxyethyl cellulose by reacting thereon with a carbalkoxy isocyanate such as carboethoxymethyl isocyanate followed amidation or hydrolysis of the ester. In many cases it is desirable to both break down the viscosity of the hydroxyethyl cellulose and impart carboxyl groups thereto. The use of hydroxyethyl cellulose so modified is included within the scope of our invention.

Carboxyl groups may be linked to the cellulose of the hydroxyethyl cellulose by means of ether linkages and be useful as additives to gelatin compositions to give good flexibility properties and in the case of photographic emulsions to impart desirable characteristics thereto. For instance, a mixed ether of cellulose having not only hydroxyethyl groups but also carboxy alkyl groups is useful in this connection.

A carboxy methyl hydroxyethyl cellulose, added to a gelatin composition such as a photographic emulsion will resist removal by processing solutions and give the various advantages such as have been listed herein.

The following examples illustrate methods of preparing modified hydroxyethyl celluloses which are useful as additives to gelatin compositions to improve the properties of coatings prepared therefrom.

*Example 5*

This example illustrates the modification of a hydroxyethyl cellulose in which the viscosity thereof is decreased with hydrogen peroxide. 1,000 grams of hydroxyethyl cellulose were dispersed in 9 liters of distilled water while the container therefor was immersed in a 50° C. water bath. There was added to this dispersion 125 ml. of 30% hydrogen peroxide and the mass was stirred at 50° C. for 17 hours. Thereupon 35 mm. of hydrazine hydrate (64% aqueous solution) were added and the stirring at 50° C. was continued. After 15 minutes evolution of gas had ceased, an additional 25 mm. of hydrazine hydrate were added with continued stirring at 50° C. After 15 minutes the test for peroxide was negative.

The resulting dope was precipitated 15 minutes later in 20 gallons of acetone accompanied by vigorous stirring for 15 minutes. The mass was allowed to stand and the hydroxyethyl cellulose settled out. The liquid was decanted therefrom, 5 gallons of fresh acetone were added, the suspension was stirred for 45 minutes and the precipitate was filtered and further washed with fresh acetone. After thorough washing with acetone the product was removed and dried at room temperature under vacuum. 850 grams of product was obtained. The inherent viscosity of the product was 0.31. The product obtained was found to be compatible with aqueous gelatin within a wide concentration range.

*Example 6*

900 grams of hydroxyethyl cellulose (inherent viscosity 1.37) was slowly added to a small Werner-Pfleiderer mixer containing 2100 ml. of distilled water. The mass was milled for 10 minutes at room temperature whereupon water having a temperature of approximately 50° C. was passed through the jacket of the mill and the operation was continued until a smooth dope resulted. There was then added 65 ml. of 30% hydrogen peroxide and the mill was run at 50° C. for 16 hours. There was then added 35 ml. of 28% ammonia and the rotation of the mixer blades was continued until a test for peroxide was negative which is usually 60–90 minutes after the addition of the ammonia. The dope was then poured in a fine stream into 5 gallons of vigorously stirred acetone which stirring was continued for 20 minutes. The precipitate was hardened thereby and acetone was removed by decantation. Washing was continued with acetone until the product was substantially rid of impurities. 821 grams of modified hydroxyethyl cellulose was obtained. The product which resulted had an inherent viscosity of 0.40.

*Example 7*

Two 73½ gram samples of hydroxyethyl cellulose were stirred, in a glass reflux outfit having air reflux condensers, with 735 ml. of pyridine on a steam bath. To these samples were added 22.5 grams and 37.5 grams respectively of succinic anhydride and the mass stirred for 140 minutes. Each of the dopes was cooled to 55° C., diluted with acetone and precipitated in a large acetone excess. After thorough washing with acetone the product was dried in a vacuum at 45° C. The products were respectively 30 and 50 mole percent reacted experimentally. Products were obtained in each of the cases having good compatibilities with gelatin compositions in considerable proportions.

*Example 8*

100 grams of hydroxyethyl cellulose (inherent viscosity 0.31) was dispersed in 500 ml. of vacuum distilled dimethylformamide while it was heated on the steam bath accompanied by stirring in an all glass reflux outfit protected from moisture. After the hydroxyethyl cellulose had dissolved or doped and the temperature had reached 90° C. there was added 10 grams of succinic anhydride. After the anhydride had dissolved, 25 ccs. of pyridine was added and the mass was heated on the steam bath for 1 hour. The product was precipitated in a large volume of acetone with vigorous agitation. After the precipitate settled it was decanted, washed with acetone, and dried at room temperature under vacuum. 103.8 grams of esterized hydroxyethyl cellulose was obtained. The combined succinic acid was equivalent to 0.68 ml. N NaOH/g. of sample.

Other types of hydroxyethyl cellulose derivatives than the dicarboxylic derivatives thereof which are useful in procedures in accordance with our invention are certain carbamyl derivatives thereof which also introduce carboxy groups. Examples 9, 10 and 11 are illustrative of the treating of hydroxyethyl cellulose in this manner to render that material more compatible for use in gelatin photographic emulsions.

*Example 9*

100 grams of low viscosity hydroxyethyl cellulose (inherent viscosity 0.40) were dispersed in 500 ml. of dimethyl formamide on a steam bath in an all glass apparatus equipped with a stirrer and protected from moisture by a calcium chloride tube. When complete dispersion had occurred and the temperature had reached 92° C., 20 grams of carbethoxymethyl isocyanate were added and heating and stirring were continued for one hour. The reaction temperature rose to 99° and then dropped to 90°. At the end of the heating period the resulting dope was poured in a fine stream into three liters of vigorously stirred acetone to precipitate the product. The precipitate was stirred repeatedly with two liter portions of fresh acetone. It was then separated from the liquid and dried in a vacuum oven at room temperature. 98 grams of product were obtained having a nitrogen content of 1.6%. This product was readily miscible with gelatin in aqueous solutions thereof and imparted characteristics to the gelatin compositions as outlined above. The product obtained was carbethoxymethylcarbamyl hydroxyethyl cellulose.

*Example 10*

30 grams of carbethoxyethylcarbamyl hydroxyethyl cellulose were dispersed at room temperature in 150 ml. of 28% aqueous ammonia. The reaction mixture was frequently shaken until solution was complete and was left at room temperature for 19 hours. The dope thus obtained was poured into two liters of acetone to precipitate the product which was repeatedly extracted with two liter portions of fresh acetone. The material obtained was dried at room temperature under vacuum. 31.5 grams of carbamidomethylcarbamyl hydroxyethyl cellulose having a nitrogen content of 2.3% was obtained. This material was of value as an additive to gelatin coating compositions particularly photographic emulsions.

*Example 11*

30 grams of carbethoxymethylcarbamyl hydroxyethyl cellulose were dispersed in 150 ml. of distilled water and the dispersion was warmed to 45° C. 10 grams of 10% aqueous potassium hydroxide were added with stirring and an additional 10 grams thereof were added to the mass at 5 minute intervals in 2 portions. After the last addition the mixture was stirred for 30 minutes. The mass was made acid to congo red by adding a sufficient amount of a mixture of 4 parts of water and 1 part of 48% hydrobromic acid and was poured into three liters of acetone with stirring. A gummy precipitate was obtained but was made friable by stirring in fresh acetone. This stirring was continued until an extract from the product was free of bromide. The product was dried in a vacuum desiccator at room temperature. 27.1 grams of carboxymethylcarbamyl hydroxyethyl cellulose was obtained. The material titrated 0.2 ml. of normal sodium hydroxide per gram. This compound was found to be useful as an additive to aqueous gelatin compositions to impart characteristics thereto as referred to herein.

In the viscosity reducing method using hydrogen peroxide on hydroxyethyl cellulose variations were employed. It is often desirable to cause viscosity reduction by progressively introducing hydrogen peroxide to the mass with stirring. Also products have been prepared having different degrees of viscosity reduction and different mole percentages of esterifying agent which had reacted with the cellulose unit. Also, various dicarboxylic acid esters of hydroxyethyl cellulose have been employed and have been found to be useful in various procedures having similar problems to those which have been outlined herein. For instance, the diglycolates, the phthalates, and the glutarates of hydroxyethyl cellulose are useful in this connection. In the case of many hydroxyethyl celluloses the product has been subjected to both procedures. Also, hydroxyethyl celluloses even those varying considerably in viscosity have been found to be effective. This holds true whether the dicarboxylic acid employed is an aromatic dicarboxylic acid or an aliphatic dicarboxylic acid, the criterion being that the compounds prepared exhibit utility in the connections in which they are used. It appears that there is little distinction between the products which have been prepared by one method of manufacture as against those which have been prepared by some similar procedure but using some special refining step such as a spray or the like.

Still further examples of the employment of hydroxyethyl cellulose or its related compounds in photographic emulsions for the purpose of improving the coatings thereof are as follows:

*Example 12*

A fine-grained gelatino silver chloride emulsion was prepared for coating by adding thereto a coating aid, a hardener, a sensitizer, and an antifoggant. The emulsion was then divided into two parts as follows: (a) no further addition, (b) added 2360 ml. of a 5% aqueous solution of hydroxyethyl cellulose per mole of silver. These compositions were coated on a glossy single weight separately coated paper at an average coverage of 525 square feet per mole of silver. Several strips 35 mm. by 10 inches were placed in a desiccator for a period of 25 hours. The test strips were conditioned for 5 minutes at 72° F. and a relative humidity of 55%. Fresh tests of a qualitative nature showed coating (b) had a much higher flexibility than coating (a). It was found that coating (b) was 0.15 log E faster than emulsion coating (a) at a density of 1.40.

*Example 13*

A fine-grained gelatino-silver chloride emulsion was prepared for coating by adding a coating aid, a hardener, a sensitizer, and an antifoggant. The material was divided equally into three parts as follows: (a) no further addition, (b) 2360 ml. of hydroxyethyl cellulose in 5% solution was added per mole of silver, (c) 1780 ml. of a 6.6% solution of carboxylated hydroxyethyl cellulose was added per mole of silver. The above emulsion samples were coated onto glossy single weight baryta coated paper at an average coverage of 600 square feet per mole of silver. It was observed by qualitative tests that coating (b) and (c) were much higher in flexibilities than coating (a). Also, the latter two coatings were approximately 0.1 log E faster than coating (a) at a density of 1.40.

We claim:

1. A photographic emulsion comprising a suspension of silver halide in an aqueous solution of gelatin containing therein, based on the weight of the gelatin, 10–50% of hydroxyethyl cellulose compound selected from the group consisting of the hydroxyethyl celluloses having inherent viscosities within the range of approximately 0.3 to 1.0 and the hydroxyethyl cellulose having both hydroxyethyl and carboxyl containing substituents on the cellulose.

2. A photographic emulsion comprising a suspension of silver halide in an aqueous solution of gelatin containing therein, based on the weight of the gelatin, 10–50% of hydroxyethyl celluose having an inherent viscosity within the range of approximately 0.3 to 1.0.

3. A photographic emulsion comprising a suspension of silver halide in an aqueous solution of gelatin containing therein, based on the weight of the gelatin, 10–50% of a hydroxyethyl cellulose having hydroxyethyl and carboxyl containing substituents on the cellulose.

4. A photographic emulsion comprising a suspension of silver halide in an aqueous solution of gelatin containing therein, based on the weight of the gelatin, 10–50% of a hydroxyethyl cellulose having hydroxyethyl and carboxycarbamyl substituents on the cellulose.

5. A photographic emulsion comprising a suspension of silver halide in an aqueous solution of gelatin containing therein, based on the weight of the gelatin, 10–50% of a hydroxyethyl cellulose having hydroxyethyl and succinoyl substituents on the cellulose.

6. A photographic film comprising cellulose ester film base support and a photo-sensitive layer comprising silver halide suspended in an aqueous solution of gelatin containing therein, based on the weight of the gelatin, 10–50% of a hydroxyethyl cellulose selected from the group consisting of the hydroxyethyl celluloses having inherent viscosities within the range of approximately 0.3 to 1.0 and the hydroxyethyl celluloses which contain both hydroxyethyl and carboxyl containing substituents on the cellulose.

References Cited in the file of this patent

UNITED STATES PATENTS

| | | |
|---|---|---|
| 1,994,038 | Hadedorn et al. | Mar. 12, 1935 |
| 2,045,411 | Richter et al. | June 23, 1936 |
| 2,245,499 | Reichel et al. | June 10, 1941 |
| 2,415,382 | Woodward | Feb. 4, 1947 |
| 2,422,572 | Lilienfeld | June 17, 1947 |
| 2,474,700 | Slifkin | June 28, 1949 |
| 2,614,929 | Yutzy | Aug. 6, 1952 |
| 2,801,919 | Eichorn | Aug. 6, 1957 |

FOREIGN PATENTS

| | | |
|---|---|---|
| 496,049 | Great Britain | Nov. 21, 1938 |